United States Patent [19]

Chang

[11] 4,317,743

[45] Mar. 2, 1982

[54] PROCESS FOR MAKING MICROCAPSULES AND RESULTING PRODUCT

[75] Inventor: John C. H. Chang, Naperville, Ill.

[73] Assignee: Wallace Business Forms, Inc., Hillside, Ill.

[21] Appl. No.: 100,638

[22] Filed: Dec. 5, 1979

[51] Int. Cl.$^3$ .............................................. B01J 13/02
[52] U.S. Cl. ................................... 252/316; 282/27.5; 424/32; 427/151; 428/914; 428/320.6
[58] Field of Search .......................... 252/316; 427/151

[56] References Cited

U.S. PATENT DOCUMENTS 3,796,669  3/1974  Kiritani et al. ....................... 252/316
4,140,516  2/1979  Scher .............................. 252/316 X
4,193,889  3/1980  Baatz et al. ......................... 252/316

OTHER PUBLICATIONS

Ulrich: "Synthesis of Polymers From Isocyanates in Polar Solvents", J. Polymer Sci., Macromolecular Reviews, vol. 11, pp. 93 and 121–123, (1976).

Primary Examiner—Richard D. Lovering
Attorney, Agent, or Firm—Roylance, Abrams, Berdo & Farley

[57] ABSTRACT

Oil-containing microcapsules are produced by emulsifying an oily solution of isocyanatoamidine products into an aqueous solution of emulsifier to form oil-in-water emulsion. The reactive isocyanatoamidine products are subsequently hydrolyzed into an impermeable capsule wall.

17 Claims, No Drawings

PROCESS FOR MAKING MICROCAPSULES AND RESULTING PRODUCT

BACKGROUND OF THE INVENTION

In a typical carbonless paper form, the back side of the top sheet has a coating of microscopic capsules containing colorless chromogens or color precursor in the oil. This top sheet is called CB paper, for coated back. The bottom sheet is the receiving sheet, which is coated with a color developer. It is designated as CF paper, for coated front. The intermediate plies have color developer coating on the front sides and microcapsules coated on the back sides. These sheets are called CFB. A self-contained paper has both the color developer and microcapsules coated on the same side of the web. When the CB and CF coatings are arranged in a manner of facing each other, a typing or writing pressure from the top side of CB paper will produce images on the CF surface. Similarly, images will also appear on all CF sides in a multiform set of CB, CFB's, and CF papers. A self-contained paper will develop images in situ upon the rupture of microcapsules by a typing or writing pressure.

Two principal techniques for the production of microcapsules have been used since the microencapsulation technology was introduced in the 1950's. Numerous patents have revealed in-depth details in this field. The first method is the phase separation of film-forming materials from the continuous phase by the coacervation process. It involves the deposit of colloidal materials, such as gelatin and gum arabic, around the oil droplets, followed by hardening with formaldehyde as taught in U.S. Pat. No. 2,800,457 (1957). Many other patents also disclose that aqueous solutions of hydrophilic colloids may be coacervated by adding various substances, such as inorganic salts and oppositely charged colloids, to the solutions. However, this process has a number of disadvantages in commercial production of the coacervates. It requires careful control of the cooling temperature over a long period of time for the colloids to deposit around oil droplets and continuous adjustment of pH-value for the system. Undesired agglomeration of microcapsules usually occurred during the subsequent hardening reaction with aldehyde. The polynuclear cluster of microcapsules makes it very difficult to produce sharp images in the carbonless papers copying system.

Another method is the interfacial polymerization of two direct-reacting intermediates around minute oil droplets. Generally, one reacting intermediate is dissolved in a hydrophobic liquid and the second intermediate is present in a hydrophilic liquid. In some cases, both reacting intermediates may be included in a hydrophobic liquid phase which is emulsified into an immiscible hydrophilic liquid. Polycondensation is then promoted by catalysts or heat so that the intermediates react with each other to yield a solid product as the skin at the interface of minute oil droplets. Typical examples of such condensates are polyamide, polyester, polyurethanes, polyurea, and the like. This interfacial polymerization requires proper selection of intermediates.

Inasmuch as this invention deals with polyisocyanates which have been used in microencapsulation before, their roles may be classified as follows:

1. Re-enforcement of the primary capsule wall.

The capsule wall formed by the coacervation process is normally swollen due to the moisture sensitivity of gelatin material. This primary wall is somewhat permeable, allowing the capsule core material to escape over a period of time. Thus, polyisocyanates have been used to alleviate such deficiency for the wall of hydrophobic polymers as disclosed in U.S. Pat. No. 3,660,304, the wall formed by complex coacervation as disclosed in U.S. Pat. No. 3,897,361, and the wall formed by the phase separation of poly(ethylene-co-vinyl acetate) as disclosed in U.S. Pat. No. 3,674,704.

2. Polymerization in the oil phase.

U.S. Pat. Nos. 3,726,804 and 3,796,669 disclose the production of microcapsules by dissolving film-forming materials in an oily liquid to be encapsulated, which then polymerize by itself or react with another film-forming material to produce a water-insoluble, high molecular weight material. The temperature of the system is raised to cause the deposit of such high molecular weight product on the surface of minute oil droplets.

3. Interfacial polymerization (other than with the emulsifier).

A number of patents, such as U.S. Pat. Nos. 3,432,327, 3,577,515, 3,886,085, 3,900,669, 4,021,595, 4,046,741, 4,119,565 and 4,120,518 have revealed the formation of microcapsules by the polymerization of polyisocyanate in the oil phase and a co-reactant, other than the emulsifier or protective colloid, from the outer phase of each oil droplet. The polymerized product precipitates at the interface to form the capsule wall. The co-reactant may be selected from polyamines, polyols, polycarboxylic acids, polythiols, and epoxy compounds. Catalysts are normally needed for the interfacial polymerization. Nevertheless, it is very difficult to attain a complete polymerization because the co-reactant is either dissolved or thoroughly dispersed in the aqueous phase in the resulting coating which will be directly exposed to the users, posing health and ecological problems. For example, polyamines and epoxy compounds have been suggested as carcinogens.

4. Interfacial cross-linking of the emulsifier.

The cross-linking of the emulsifier by polyisocyanates at the interface of oil droplets has been disclosed in U.S. Pat. Nos. 3,895,074, 4,025,455, 4,107,071 and 4,138,362. Polyisocyanates in the oil phase react with the water-soluble emulsifier to produce a water-insoluble film as the capsule wall. The choice of the cross-linkable polymers, both synthetic and natural, is very critical for this method. The use of catalysts is also suggested.

SUMMARY OF THE INVENTION

The present invention relates to a process for producing microcapsules having a strong impermeable shell. More specifically, it relates to a process for producing oil-containing microcapsules having a shell of hydrolyzed isocyanatoamidine product.

The preparation of simple amidines is well described in the book of "The Chemistry of Amidines and Imidates" by Paul Patai, John Wiley & Sons, Ltd., 1975, and in the Journal of Polymer Science: Macromolecular Reviews, volume 11, pages 93–133, 1976, by Henri Ulrich. However, the present invention involves novel isocyanatoamidines.

The present process utilized two substantially immiscible liquids, one termed oil phase and the other termed aqueous phase, to produce a physical dispersion of oil droplets in a continuous aqueous phase, i.e., an oil-in-water emulsion. The oil phase comprises materials to be encapsulated and isocyanatoamidine product as the wall-forming material in a hydrophobic liquid. The aqueous phase contains a water-soluble emulsifier which acts solely as the protective colloid. The isocyanatoamidine product is then hydrolyzed at the interface of each oil droplet into a strong solid capsule wall which is insoluble in either the oil or water. This simple process does not require pH adjustment, use of catalysts, addition of polymerization promoters, or further enhancement by a secondary cross-linking reaction from the outer phase of capsules.

The present process for making microcapsules provides several unique advantages over the prior art mentioned in the previous section. It has been found that isocyanatoamidines react with other isocyanates to yield high molecular weight isocyanatoamidine products which are easily hydrolyzed by water in the continuous phase into an impermeable capsule wall. It is a surprising finding that no cross linking reaction was observed. The hydrolysis is actually independent of the emulsifier used to produce microcapsules as evidenced in Examples 5 and 6. Therefore, the addition of a separate co-reactant in the aqueous phase for interfacial polymerization reaction is consequently obviated. The resulting microcapsules are non-agglomerating mononuclear, discrete and spherical capsules which offer sharp manifolding when employed in the pressure-sensitive copying system. The particle size may range from about 2 microns to about 100 microns in diameter. More importantly, the capsule wall exhibits excellent heat stability and humidity resistance. By the process of this invention, an up to 60% solid contents of microcapsules emulsion may be produced as compared to about 25% usually obtained by coacervation process. In view of the high heat requirement to dry water-based coatings, the present invention proves to be an energy-saving process.

DETAILED DESCRIPTION

Production of Isocyanatoamidine

The initial step in this invention involves the reaction of an isocyanate compound and a N,N-disubstituted amide to produce isocyanatoamidine. It is usually accompanied by the loss of carbon dioxide as illustrated below.

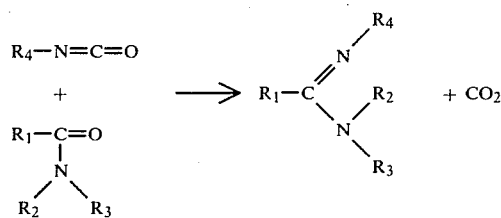

wherein $R_1$ represents hydrogen or lower alkyl group, such as methyl, ethyl, propyl, and butyl; $R_2$ and $R_3$ represent lower alkyl groups, such as methyl, ethyl, propyl, and butyl; $R_4$ represents an isocyanatoaryl group, such as 3-isocyanatophenyl 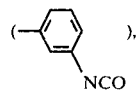

4-isocyanato-2-tolyl 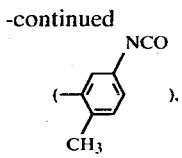

6-isocyanato-2-tolyl 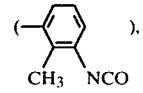

α-(4'-isocyanatophenyl)-4-tolyl 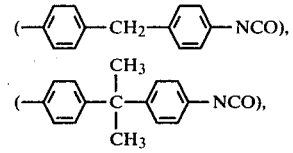

α-(4'isocyanato)-4-cumenyl 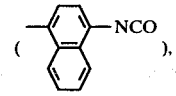

4-isocyanato-1-naphthyl 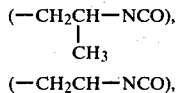

and the like; an isocyanatoalkyl group, such as

| | |
|---|---|
| 2-isocyanatopropyl | $(-CH_2CH-NCO)$, <br> $\quad\quad\quad\; |$ <br> $\quad\quad\quad CH_3$ |
| 2-isocyanatobutyl | $(-CH_2CH-NCO)$, <br> $\quad\quad\quad\; |$ <br> $\quad\quad\quad CH_2CH_3$ |
| 6-isocyanatohexyl | $(-CH_2CH_2CH_2CH_2CH_2CH_2-NCO)$, | and the like; and an isocyanatocycloalkyl group, such as 2-isocyanatocyclohexyl 

4-isocyanatocyclohexyl 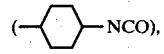

and the like.

Typical examples of isocyanate compounds are aryl isocyanates, such as 2,4-toluene-diisocyanate, 2,6-toluenediisocyanate, m-phenylene diisocyanate, 4,4'-isopropylidene diphenyldiisocyanate, 3,3'-dimethyl-4,4'-methylenediphenyldiisocyanate, 4,4'-methylenediphenyldiisocyanate, 1,4-naphthyldiisocyanate, 1,3-xylene-diisocyanate, 1-4-xylene-diisocyanate, etc.; alkyl isocyanates, such as propylene-1,2-diisocyanate, butylene-1,2-diisocyanate, hexamethylene-diisocyanate, etc.; cyclic alkyl isocyanates, such as cyclohexyl-1,2-diisocyanate, cyclohexyl-1,4-diisocyanate, etc.; adduct of isocyanate and hydroxy compounds are also useful. Typical examples of hydroxy compounds are ethylene glycol, 1,3-propylene glycol, 1,5-pentanediol, 1,6-heptanediol, 2-ethyl-hexane-1,3-diol, hexanetriol, 2-ethyl-2-(hydroxymethyl)-1,3-propanediol, pentaneerythritol, sorbitol, and the like.

Suitable amides include N,N-dimethylformamide, N,N-diethylformamide, N,N-dipropylformamide, N,N-dibutylformamide, N,N-dimethylacetamide, N,N-diethylacetamide, N,N-dipropylacetamide, N,N-dibutylacetamide, and N-methyl-2-pyrrolidone.

The temperatures for carrying out reactions are about 150° C. for N,N-dialkylformamides, about 80° C. for N,N-dialkylacetamides, and about 230° C. for N-alkylpyrrolidones. The reaction time for the formation of isocyanatoamidines is about 2 hours to about 30 hours; preferably, about 4 hours to about 20 hours.

The second step in this invention is the reaction of isocyanatoamidine with another isocyanate compound to yield a final isocyanatoamidine product which may be readily hydrolyzed. The reaction temperature may range from about 40° C. to about 120° C. for 4 to 10 hours; preferably about 60° C. to about 100° C. for 4 to 6 hours. The molar ratio has been found to be 1 mole of isocyanatoamidine to 1–5 moles of isocyanate compound; preferably, the ratio of 1 to 5.

Solution of Isocyanatoamidine Products

The desired weight of isocyanatoamidine product per 100 parts of a hydrophobic liquid (i.e., oil) is generally about 2 to about 15 parts; preferably, about 4 to about 10 parts by weight.

The preferred hydrophobic liquids for this invention are alkylnaphthalenes, terpenes, isopropylbiphenyls, benzylated xylenes, ethyldiphenylmethanes, dimethyldiphenylethanes, tributyl phosphate, tricresyl phosphate, and the mixtures of the said oil and kerosene. Suitable co-solvents for dissolving isocyanatoamidine product in the hydrophobic liquid are acetone, methyl ethyl ketone, ethyl acetate, tributyl phosphate, tricresyl phosphate, dioxane, and tetrahydrofuran.

The Aqueous Phase

The quantity of the protective colloid for 100 parts by weight of the core material (including the oil and the small amounts of dye and amidine products) is generally between about 0.5 and about 40 parts by weight; preferably, between about 2 and about 30 parts by weight.

Typical examples of protective colloids are carboxymethyl cellulose, hydroxymethylpropyl cellulose, hydroxyethyl cellulose, hydroxypropyl cellulose, cellulose acetate butyrate, cellulose acetate propionate, cellulose phthalate, casein, gelatin, starch, benzylated starch, benzylated gelatin, gum arabic, chitosan, gum tragacanth, guar gum, carrageenan, polyvinylalcohol, polyvinylacetate, styrene-maleic anhydride copolymer, methyl vinylether-maleic anhydride copolymer, partially hydrolyzed poly(ethylene-co-vinyl acetate), and the like. Other natural and synthetic polymers may also be used as protective colloids.

The Hydrolysis Reaction

The hydrolysis reaction of isocyanatoamidine product may be conducted at any suitable temperature, for example, between about ambient temperature and about 100° C. for a period of time of about 1 and 24 hours. Preferably, the temperature is in the range of between about 40° C. and about 80° C. for a period of about 1 to 3 hours, yielding carbamic acid which precipitates around the oil droplets to form the capsule wall.

The present invention is further illustrated, but not limited by the following examples.

EXAMPLE 1

The purpose of this example is to illustrate the fact that the amidine products are necessary to the practice of the invention—these products not being achieved in this example.

A solution of 7.4 grams of 2-ethyl-hexane-1,3-diol in 10 grams of isopropylbiphenyls oil was added dropwise to a solution of 17.6 grams of TD-80 (mixture of 80% by weight of 2, 4- and 20% by weight of 2,6-toluenediisocyanates, Mobay Chemical Company) in 15 grams of isopropylbiphenyls at about 50° C. The temperature was gradually increased to 80° C. and kept at that temperature for 3½ hours. A viscous solution was obtained.

Three grams of the above product were dissolved in a solution of 1.5 grams of crystal violet lactone in 50 grams of isopropylbiphenyls. The solution was emulsified into 50 grams of 15% benzyl gelatin solution to produce minute oil droplets having about 5 microns in diameter. The emulsion was heated at 60° C. for 2 hours to complete the microencapsulation.

The microcapsules were coated on a paper web to provide a transfer sheet. When this sheet was arranged in a contiguous juxtaposition with a receiving sheet coated with a phenolic novolak resin, instant blue images were formed on the receiving sheet. A separate transfer sheet was then subjected to an accelerated heat-aging test at 100° C. for 3 hours for comparison. The aged sheet developed faint and discontinuous images on the receiving sheet, indicating that capsules were imperfect to hold the core material. The ensuing example illustrates the preferred practice where the isocyanate-amide reaction is present.

EXAMPLE 2

To ten grams of the viscous product of 2-ethyl-hexane-1,3-diol and TD-80 in Example 1 were added 1.76 grams of N,N-dimethylacetamide. The mixture was heated at 85° C. for 6 hours. A slow evolution of carbon dioxide was observed during the reaction. Resulting therefrom was a product having at least some proportion of the hetero-cyclic isocyanatoamidine products inasmuch as the amount of acetamide was greater than the stoichiometric amount.

Three grams of the above product were mixed in a solution of 1.5 grams for crystal violet lactone in 50 grams of isopropylbiphenyls. This resulting solution was encapsulated as core material and evaluated according to the procedure of Example 1. The aged transfer sheet showed a good capsule wall integrity upon mating with a receiving sheet.

EXAMPLE 3

A mixture of 12 grams of ethyl acetate, 27.8 grams of TD-80, and 7.14 grams of 2-ethyl-2-(hydroxymethyl)-1,3-propanediol was gently refluxed for 3 hours in a 125-ml round-bottomed flask. A viscous solution was produced.

Three grams of the above product were added into a solution of 1.5 grams crystal violet lactone in 50 grams of benzylated xylenes and 0.8 grams of tributyl phosphate. This solution was emulsified into 50 grams of 15% gelatin (gel strength 135 grams) solution to produce oil droplets having an average particle size of about 5 microns. The emulsion was then heated at about 50° C. for 3 hours. The resulting microcapsules were coated over a phenolic novolak resin on the receiving sheet. Upon drying the coating in an oven at 80° C., the coating turned blue. This indicated that the capsule wall was permeable enough for the dye solution to leach out and react with phenolic novolak resin into a blue color.

EXAMPLE 4

In a 125-ml round-bottomed flask, a mixture of 12 grams of ethyl acetate, 27.8 grams of TD-80, and 7.14 grams of 2-ethyl-2-(hydroxymethyl)-1, 3-propanediol was gently refluxed for 3 hours. While maintaining the temperature at 80° C., 2.5 grams of N,N-dimethylacetamide were added. The temperature was maintained at about 80° C. for 7 hours. Decarboxylation occurred after one hour of heating and subsided toward the end of reaction.

Three grams of the above product were evaluated in the same manner described in Example 3. The final coating remained virtually colorless after drying in an oven of 80° C. It showed that the capsule wall was superior to that of Example 3.

EXAMPLE 5

The purpose of this experiment was to demonstrate that the capsule wall was formed by the hydrolyzed substance of isocyanatoamidine product, regardless of the emulsifiers used. The volume of oil phase was the same as the volume of aqueous phase for each emulsifier solution.

Oil Phase: A mixture of 8.3 grams of ethyl acetate, 19.3 grams of TD-80, and 4.9 grams of 2-ethyl-2-(hydroxymethyl)-1,3-propanediol was mildly refluxed for 3 hours. While maintaining the temperature at 75° C., 1.73 grams of N,N-dimethylacetamide were added. Decarboxylation occurred after one hour of heating and subsided in about 7 hours. Six grams of the above product were dissolved in a mixture of 8 grams tributyl phosphate and 100 grams of isopropylbiphenyls. Fifteen milliliters aliquot was used for each emulsifier solution.

Aqueous phase: Fifteen milliliters of each emulsifier solution were used.

Concentrations (by weight) are noted individually as follows:

| | |
|---|---|
| Vinol 540 polyvinylalcohol | 6% |
| animal glue - 135 | 15% |
| benzylated animal glue - 135 | 15% |
| hydroxypropylmethylcellulose | 0.936% |
| Gantrez AN-119 | 10% |
| hydroxypropylcellulose (Klucel L) | 3.71% |
| water (control) | |

Each aqueous solution was placed in a glass cylinder (39-mm diameter, 50-mm height) through a pipette. Fifteen milliliters of oil solution were carefully added onto each aqueous solution through another dry pipette to form two distinct layers. Each glass cylinder was tightly covered with a plastic film and immersed about 40-mm into a constant temperature bath at 60° C. for two hours. An insoluble film formed at the interface of oil and water layers in each case.

The film was taken out, washed with 60-ml of oil composed of 8 parts of tributyl phosphate and 100 parts of isopropylbiphenyls. The film was further washed with 60-ml of hexane, followed by stirring in distilled water at 60° C. for two hours. The insoluble solid was collected by filtration, rinsed with cold distilled water, dried in an oven at 60° C., and stored in a dry vial for infrared spectrophotometric analysis and elemental analysis. Infrared spectra (in Nujol mull) of all seven samples were structurally identical, using Infrared Spectrophotometer Model 297 of Perkin-Elmer. Again, all seven samples exhibited the identical chemical composition based on the elemental analyses performed by Micro-Tech Laboratories, Inc., Skokie, Ill., 60076. Carbon, hydrogen and nitrogen elemental analyses of all emulsifiers are tabulated in Table 1 for comparison. Results for all seven samples are included in Table 2.

TABLE 1

| Elemental Analysis of Emulsifiers | | | |
|---|---|---|---|
| Emulsifier | % C | % H | % N |
| Vinol 540 polyvinylalcohol | 54.01 | 9.10 | 0 |
| animal glue - 135 | 44.85 | 6.77 | 16.45 |
| benzylated animal glue - 135 | 46.65 | 5.91 | 15.26 |
| hydroxypropylmethylcellulose | 48.62 | 7.26 | 0 |
| Gantrez AN-119 | 49.32 | 5.27 | 0 |
| hydroxypropylcellulose (Klucel L) | 54.29 | 8.65 | 0 |

TABLE 2

| Elemental Analysis of Capsule Walls (Equal Volume) | | | | |
|---|---|---|---|---|
| FIG. | Emulsifier used to obtain capsule wall material | % C | % H | % N |
| 2 | Vinol 540 polyvinylalcohol | 61.29 | 5.93 | 11.46 |
| 3 | animal glue - 135 | 61.13 | 5.83 | 11.14 |
| 4 | benzylated animal glue - 135 | 61.72 | 5.68 | 11.34 |
| 5 | hydroxypropylmethylcellulose | 61.30 | 5.79 | 11.36 |
| 6 | Gantrez AN-119 | 61.50 | 5.87 | 11.38 |
| 7 | hydroxypropylcellulose (Klucel L) | 61.23 | 6.09 | 11.39 |
| 8 | water (control) | 61.19 | 5.80 | 11.55 |

EXAMPLE 6

The purpose of this experiment was to show that the capsule wall was formed by the hydrolyzed substance of isocyanatoamidine product instead of the cross-linked emulsifier. The amount of oil phase was 10 grams in each case. The dry weight of each emulsifier was the same in all cases.

Oil phase: Ten grams of oil solution prepared according to the procedure of Example 5.

Aqueous phase: Fifteen grams of each emulsifier solution listed below were used. The concentration of each aqueous solution was 10% by weight.
animal glue—135
benzylated animal glue—135
hydroxypropylcellulose (Klucel L)
Gantrex AN-119
Vinol 540 polyvinylalcohol (87–89% hydrolysis, med mol wt)
Elvanol 70-05 polyvinylalcohol (98–99% hydrolysis)
Covol 9700 polyvinylalcohol (87–89% hydrolysis, low mol wt) water (control)

The procedure of Example 5 was repeated to obtain dry capsule wall materials. Infrared spectra (in Nujol mull) of all eight samples were virtually identical. The elemental analyses of capsule wall materials also revealed the same chemical constituents as shown in Table 3.

TABLE 3

| Elemental Analysis of Capsule Walls (Equal Weight) | | | | |
|---|---|---|---|---|
| FIG. | Emulsifier used to obtain capsule wall material | % C | % H | % N |
| 9 | animal glue - 135 | 62.18 | 6.00 | 11.53 |
| 10 | benzylated animal glue - 135 | 62.76 | 6.02 | 11.27 |
| 11 | hydroxypropylcellulose (Klucel L) | 62.26 | 5.87 | 11.50 |
| 12 | Gantrez AN-119 | 62.40 | 6.08 | 11.53 |
| 13 | Vinol 540 polyvinylalcohol | 62.28 | 6.10 | 11.41 |
| 14 | Elvanol 70-05 polyvinylalcohol | 62.06 | 6.09 | 11.57 |
| 15 | Covol 9700 polyvinylalcohol | 62.18 | 6.11 | 11.50 |
| 16 | water (control) | 62.20 | 5.93 | 11.46 |

EXAMPLE 7

In a flask equipped with a drying tube, 16.8 grams of hexamethylene diisocyanate and 11.5 grams of N,N-diethylacetamide were heated at 150° C. for 15 hours. Carbon dioxide was generated as gas bubbles. After the completion of reaction, 67.2 grams of hexamethylene diisocyanate were added into the slightly yellowish solution. Heating was continued at about 150° C. for an additional 4 hours. The viscous liquid was further added to 26.8 grams of 2-ethyl-2-(hydroxymethyl)-1,3-propanediol and heated for 4 more hours to yield isocyanatoamidine product.

Four grams of the above product were dissolved in 4 grams of tributyl phosphate. This solution was added into a solution of 2 grams of 2-methyl-6-diethylaminofluoran in 50 grams of isopropylnaphthalenes. The resulting solution was emulsified into 50 grams of 15% benzyl gelatin solution to obtain oil droplets having a particle size of about 3 to about 7 microns. The emulsion was cured at 50° C. for 4 hours to form impermeable capsule wall.

With the scope of the present invention, the herein disclosed microencapsulation process may be used to encapsulate printing inks, chemical reagents, pharmaceuticals, fertilizers, fungicides, pesticides, adhesives, poisons, perfumes and chromogenic compounds known in the art of carbonless paper copy system, such as crystal violet lactone, benzoyl leuco methylene blue, fluorans, phthalides, leucoauramines, rhodamine B lactams, derivatives of Michler's hydrol, and the like. Thus, the encapsulatable material may be the hydrophobic material itself—such as aromatic oils, organophosphates, ketone, perfume, adhesive monomer, or liquid solution as in the case of dyes dissolved in the hydrophobic liquid, or solid dispersion such as pigments suspended in the hydrophobic liquid.

While in the foregoing specification a detailed description of the invention has been set down for the purpose of explanation, many variations in the details hereingiven may be made by those skilled in the art without departing from the spirit and scope of the invention.

I claim:

1. A process for making microcapsules comprising: dissolving an isocyanatoamidine product in a hydrophobic liquid, said isocyanatoamidine product comprising the reaction product of (A) an isocyanatoamidine having the formula

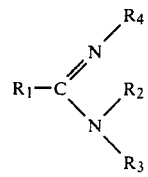

wherein $R_1$ is a member selected from the group consisting of hydrogen and a lower alkyl group, $R_2$ and $R_3$ are members selected from the group consisting of lower alkyl groups, and $R_4$ is a member selected from the group consisting of an isocyanatoaryl group, an isocyanatoalkyl group and an isocyanatocycloalkyl group and (B) an isocyanate, and thereafter introducing the solution thus achieved into an aqueous emulsifier under conditions promotive of hydrolysis of said product to produce an impermeable capsule wall surrounding hydrophobic liquid.

2. The process of claim 1 in which said solution includes a soluble dye ingredient.

3. The process of claim 1 in which said hydrolysis is conducted at a temperature from ambient to about 100° C. and for a period of time from about one to 24 hours.

4. The process of claim 3 in which said hydrolysis is conducted at a temperature in the range of about 40° C. to about 80° C. and for a period of time from about one to about three hours.

5. The process of claim 1 in which said isocyanatoamidine product is the reaction product of an isocyanate and an amide.

6. The process of claim 5 in which the said reaction is carried on for from 2 to 30 hours at a temperature in the range of about 80° C. to about 230° C.

7. The process of claim 6 in which the said amide is a member selected from the class consisting of N,N-dialkylformamides, N,N-dialkylacetamides and N-alkyl-pyrrolidones, the temperature for carrying out the reaction being about 150° C. for N,N-dialkylformamides, about 80° C. for N,N-dialkylacetamides, and about 230° C. for N-alkyl-pyrrolidones.

8. The process of claim 5 in which said isocyanate (B) is present in an amount of from about 1 to about 5 moles per mole of said isocyanatoamidine.

9. The process of claim 8 in which the further reaction is carried out at a temperature in the range of 40° C. to about 120° C. for about 4 to about 10 hours.

10. The process of claim 1 in which the said isocyanatoamidine product is present in about 2 to about 15 parts by weight to 100 parts by weight by hydrophobic liquid.

11. A process for making microcapsules comprising: reacting an isocyanate having a radical consisting of a member selected from the group consisting of an isocyanatoaryl group, an isocyanatoalkyl group and an isocyanatocycloalkyl group with an amide at a temperature of about 80° C. to about 230° C. for a time of about 2 hours to 30 hours to produce an isocyanatoamidine, further reacting said isocyanatoamidine with 1 to 5 moles of free isocyanate to obtain a readily hydrolyzable isocyanatoamidine product, then dissolving said isocyanatoamidine product resulting therefrom in a hydrophobic liquid in the ratio of 2 to 15 parts of product to 100 parts of liquid, introducing the solution thus achieved into an aqueous emulsifier under conditions promotive of hydrolysis to produce capsules having a diameter of about 2 to about 100 microns and characterized by an impermeable wall surrounding hydrophobic liquid.

12. The process of claim 11 in which the hydrolysis promoting conditions include a temperature in the range of ambient to 100° C. and the residence time of hydrophobic liquid in the emulsifier is from about one to about 24 hours.

13. The process of claim 12 in which the hydrolysis temperature is from about 40° C. to about 80° C. and the hydrolysis time is from about one to about three hours.

14. The process of claim 11 in which the said emulsifier is a protective colloid, said capsule including 100 parts by weight of core material and from about 0.5 to about 40 parts by weight of said protective colloid.

15. The process of claim 14 in which the protective colloid is present in an amount of about 2 to about 30 parts by weight.

16. The process of claim 11, wherein said capsules have a diameter of between about 3 to about 7 microns.

17. Microcapsules having impermeable walls consisting essentially of the hydrolyzed reaction product of (A) an isocyanatocycloalkyl having the formula

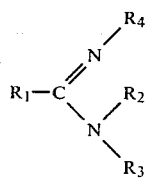
wherein $R_1$ is a member selected from the group consisting of hydrogen and a lower alkyl group, $R_2$ and $R_3$ are members selected from the group consisting of lower alkyl groups, and $R_4$ is a member selected from the group consisting of an isocyanatoaryl group, an isocyanatoalkyl group and an isocyanatocylcoalkyl group and (B) an isocyanate.
* * * * *